(12) United States Patent
Sun

(10) Patent No.: US 12,147,116 B2
(45) Date of Patent: Nov. 19, 2024

(54) LIGHT-EMITTING PLATE, METHOD FOR MANUFACTURING LIGHT-EMITTING PLATE, AND DISPLAY TERMINAL

(71) Applicant: TCL CHINA STAR OPTOELECTRONICS TECHNOLOGY CO., LTD., Shenzhen (CN)

(72) Inventor: Hejing Sun, Shenzhen (CN)

( * ) Notice: Subject to any disclaimer, the term of this patent is extended or adjusted under 35 U.S.C. 154(b) by 0 days.

(21) Appl. No.: 17/780,982

(22) PCT Filed: May 20, 2022

(86) PCT No.: PCT/CN2022/094123
§ 371 (c)(1),
(2) Date: May 29, 2022

(87) PCT Pub. No.: WO2023/201826
PCT Pub. Date: Oct. 26, 2023

(65) Prior Publication Data
US 2024/0160063 A1  May 16, 2024

(30) Foreign Application Priority Data
Apr. 22, 2022 (CN) .......................... 202210438974.2

(51) Int. Cl.
*G02F 1/00* (2006.01)
*G02F 1/13357* (2006.01)

(52) U.S. Cl.
CPC .. *G02F 1/133603* (2013.01); *G02F 1/133605* (2013.01)

(58) Field of Classification Search
None
See application file for complete search history.

(56) References Cited

U.S. PATENT DOCUMENTS 11,892,674 B2 * 2/2024 Deng ................... G02B 6/0038
2003/0002281 A1 1/2003 Suehiro
(Continued)

FOREIGN PATENT DOCUMENTS

| CN | 111369903 A | 7/2020 |
| CN | 113126363 A | 7/2021 |
| CN | 215986820 U | 3/2022 |

OTHER PUBLICATIONS

International Search Report in International application No. PCT/CN2022/094123, mailed on Dec. 19, 2022.
(Continued)

*Primary Examiner* — Gerald J Sufleta, II

(57) ABSTRACT

The present disclosure provides a light-emitting plate and a preparation method thereof and a display terminal, wherein the light-emitting plate includes a drive substrate and light sources. The light-emitting plate further includes light reflecting structures, one of light sources is located between two adjacent light reflecting structures. Each of the light reflecting structures includes a first side surface and a second side surface facing an adjacent light source, respectively. One end of the first side surface and one end of the second side surface are connected to the drive substrate. In one of the light reflecting structures, both of the first side surface and the second side surface are concave, and the first side surface and the second side surface are recessed toward each other.

17 Claims, 4 Drawing Sheets

(56) References Cited

U.S. PATENT DOCUMENTS

| | | | | |
|---|---|---|---|---|
| 2011/0277361 A1* | 11/2011 | Nichol | ................ | G02B 6/0028 |
| | | | | 40/541 |
| 2012/0026430 A1* | 2/2012 | Chen | ................... | G02B 6/0016 |
| | | | | 362/609 |
| 2012/0294039 A1* | 11/2012 | Fan | ..................... | G02B 6/0038 |
| | | | | 385/36 |
| 2019/0371872 A1* | 12/2019 | Nendai | ............... | H10K 59/878 |

OTHER PUBLICATIONS

Written Opinion of the International Search Authority in International application No. PCT/CN2022/094123, mailed on Dec. 19, 2022.
Chinese Office Action issued in corresponding Chinese Patent Application No. 202210438974.2 dated Jan. 28, 2023, pp. 1-6.

\* cited by examiner

LIGHT-EMITTING PLATE, METHOD FOR MANUFACTURING LIGHT-EMITTING PLATE, AND DISPLAY TERMINAL

TECHNICAL FIELD

The present disclosure relates to the field of backlight display, and in particular, to a light-emitting plate, a method for manufacturing the light-emitting plate and a display terminal.

BACKGROUND

With the continuous maturation of Mini-LED technology, products using related technology have been successively implemented. The Mini-LED mainly assists the upgrade of liquid crystal display panels and small spacing light-emitting diodes in terms of backlight and self-illumination, respectively. The use in backlight focus on helping the upgrade of displaying of liquid crystal display panels. In combination with the liquid crystal display panels, it is possible to realize borderless light sources, region control, and the like, to help the conventional liquid crystal display panels to improve the contrast and clarity, thereby narrowing the difference in performance with organic light-emitting diodes. In addition, the Mini-LED substrates, as the backlight of the liquid crystal display panels, have a lower cost than that of the organic light-emitting diode, thereby allowing the liquid crystal display panels to have a chance to compete with the organic light-emitting diodes in the medium and high-end market. Another use in self-luminous is that, Mini-LED or Micro-LED self-luminous is the upgrade of the small spacing light-emitting diodes. Due to the continuous minification of light-emitting diodes, there is a certain degree of optical crosstalk between the light-emitting diode chips, resulting in an adverse effect on the improvement of the quality of the picture.

TECHNICAL PROBLEMS

There is a certain degree of optical crosstalk between the light-emitting diode chips, which affects the improvement of image quality.

TECHNICAL SOLUTIONS

In view of the above, the present disclosure provides a light-emitting plate capable of reducing optical crosstalk and improving light output efficiency and a preparation method thereof.

To solve the above problems, the present disclosure provides the following technical solutions.

According to a first aspect, the present disclosure provides a light-emitting plate comprising a drive substrate and a plurality of light sources disposed on the drive substrate and electrically connected to a circuit in the drive substrate, wherein the light-emitting plate further comprises a plurality of light reflecting structures disposed on the drive substrate, one of the light sources is located between two adjacent light reflecting structures, each of the light reflecting structures comprises a first side surface facing an adjacent light source and a second side surface away from the first side surface; and in one of the light reflecting structures, both of the first side surface and the second side surface are concave, and the first side surface and the second side surface are recessed toward each other.

In an alternative embodiment of the present disclosure, both of the first side surface and the second side surface are arc surfaces, and a center of each of the arc surfaces is located on a side of the one of light sources facing the first side surface. In an alternative embodiment of the present disclosure, each of the first side surface and the second side surface is formed by connecting at least two planes.

In an alternative embodiment of the present disclosure, a height of the light sources is lower than a height of the light reflecting structures in a direction perpendicular to the drive substrate.

In an alternative embodiment of the present disclosure, one of accommodating cavities is disposed between two adjacent light reflecting structures, and the light sources are accommodated in the accommodating cavities; and a size of an opening of one end of each of the accommodating cavities that is away from the drive substrate is greater than or equal to a size of the light sources in a direction parallel to the drive substrate.

In an alternative embodiment of the present disclosure, a height of the light sources is equal to a height of the light reflecting structures in a direction perpendicular to the drive substrate.

In an alternative embodiment of the present disclosure, one of accommodating cavities is disposed between two adjacent light reflecting structures, and the light sources are accommodated in the accommodating cavities; and a size of an opening of one end of each of the accommodating cavities that is away from the drive substrate is greater than a size of the light sources in a direction parallel to the drive substrate.

In an alternative embodiment of the present disclosure, a material for forming the light reflecting structures comprises at least one of an ink base and a photosensitive base, and reflective particles dispersed in at least one of the ink base and the photosensitive base.

In an alternative embodiment of the present disclosure, each of the light reflecting structures comprises a plurality of light reflecting layers stacked on the drive substrate, and sizes of the light reflecting layers become smaller and then are increased in a first direction from a light reflecting layer close to the drive substrate to a light reflecting layer farthest from the drive substrate; wherein the first direction is parallel to the drive substrate and is in consistent with a recessed direction of the first side surface of each of the light reflecting structures.

In an alternative embodiment of the present disclosure, the reflective particles have a diameter of less than 10 microns.

According to a second aspect, the present disclosure provides a method of manufacturing a light-emitting plate, comprising the steps of:
  preparing a light reflecting mixture, wherein the light reflecting mixture comprises reflective particles mixed together with at least one of a photosensitive base and an ink base;
  providing a drive substrate, and patterning the light reflecting mixture formed on the drive substrate by a photolithography process or a 3D printing process to obtain a plurality of light reflecting structures, wherein a first side surface and a second side surface opposite to the first side surface in two adjacent light reflecting structures are concave; and
  providing a plurality of light sources on the drive substrate, wherein one of the light sources is located between two adjacent light reflecting structures.

In an alternative embodiment of the present disclosure, the light reflecting structures are formed by a photolithography process or a 3D printing process when the light reflecting mixture comprises the reflective particles and the photosensitive base, or when the light reflecting mixture comprises the reflective particles, the photosensitive base and the ink base; and the light reflecting structures are formed by a 3D printing process when the light reflecting mixture comprises the reflective particles and the ink base.

In an alternative embodiment of the present disclosure, the photolithography process comprises:
coating the light reflecting mixture on the drive substrate;
subjecting simultaneously one side of the light reflecting mixture facing to the drive substrate and the other side of the light reflecting mixture away from the drive substrate to a first heating;
patterning the light reflecting mixture by an exposure and development process; and
subjecting the patterned light reflecting mixture to a second heating to obtain the light reflecting structures.

In an alternative embodiment of the present disclosure, the 3D printing process comprises performing a 3D printing to the light reflecting mixture as a 3D printing material on the drive substrate in stages, to form a plurality of light reflecting layers stacked on the drive substrate; and sizes of the light reflecting layers become smaller and then are increased in a first direction, from a light reflecting layer close to the drive substrate to a light reflecting layer farthest from the drive substrate; wherein the first direction is parallel to the drive substrate and is in consistent with a recessed direction of the first side surface of each of the light reflecting structures.

According to a third aspect, the present disclosure provides a display terminal, comprising a backlight module and a display panel disposed opposite to each other, wherein the backlight module comprises a light-emitting plate located on a light incident side of the display panel; the light-emitting plate includes a drive substrate and a plurality of light sources disposed on the drive substrate and electrically connected to a circuit of in the drive substrate. The light-emitting plate further includes a plurality of light reflecting structures disposed on the drive substrate; one of the light sources is located between two adjacent light reflecting structures, each of the light reflecting structures comprises a first side surface facing an adjacent light source and a second side surface away from the first side surface; and in one of the light reflecting structures, both of the first side surface and the second side surface are concave, and the first side surface and the second side surface are recessed toward each other.

In an alternative embodiment of the present disclosure, both of the first side surface and the second side surface are arc surfaces, and a center of each of the arc surfaces is located on a side of the one of light sources facing the first side surface.

In an alternative embodiment of the present disclosure, each of the first side surface and the second side surface is formed by connecting at least two planes.

In an alternative embodiment of the present disclosure, a height of the light sources is lower than a height of the light reflecting structures in a direction perpendicular to the drive substrate; one of accommodating cavities is disposed between two adjacent light reflecting structures, and the light sources are accommodated in the accommodating cavities; and a size of an opening of one end of each of the accommodating cavities that is away from the drive substrate is greater than or equal to a size of the light sources in a direction parallel to the drive substrate.

In an alternative embodiment of the present disclosure, a height of the light sources is equal to a height of the light reflecting structures in a direction perpendicular to the drive substrate, and one of accommodating cavities is disposed between two adjacent light reflecting structures, and the light sources are accommodated in the accommodating cavities; and a size of an opening of one end of each of the accommodating cavities that is away from the drive substrate is greater than a size of the light sources in a direction parallel to the drive substrate.

In an alternative embodiment of the present disclosure, a material for forming the light reflecting structures comprises at least one of an ink base and a photosensitive base, and reflective particles dispersed in at least one of the ink base and the photosensitive base.

BENEFICIAL EFFECTS

The present disclosure provides a light-emitting plate and a method for manufacturing the light-emitting plate wherein one of light reflecting structures is disposed between two adjacent light sources, and surfaces of the light reflecting structures facing the light sources are set as concave surfaces. Therefore, light in each direction emitted from the side surfaces of two adjacent light sources can be collected by the light gathering effect of concave surfaces, so that not only optical crosstalk between the two adjacent light sources can be reduced, but also light loss can be reduced, thereby improving light output efficiency and improving picture quality.

BRIEF DESCRIPTION OF THE DRAWINGS

In order to more clearly describe the technical solutions in the embodiments of the present disclosure, accompanying drawings required in the description of the embodiments will be briefly described below. It is apparent that the accompanying drawings in the following description are merely some embodiments of the present disclosure, and other drawings may be obtained by those skilled in the art without creative efforts according to these accompanying drawings.

DETAILED DESCRIPTION OF THE INVENTION

Figure 1:
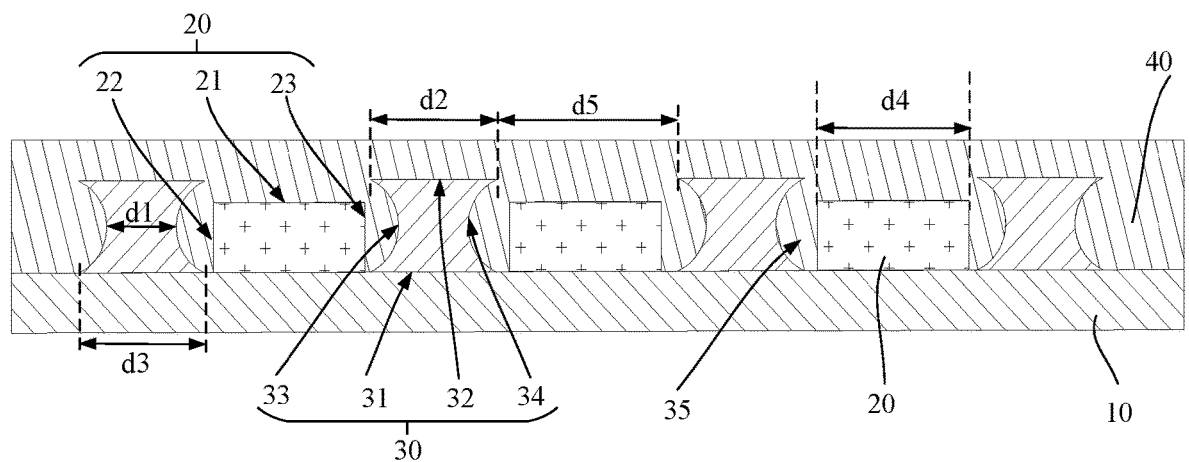
FIG. 1 is a cross-sectional view of a light-emitting plate according to a first embodiment of the present disclosure.

Technical solutions in the embodiments of the present disclosure will be clearly and completely described below in conjunction with accompanying drawings in the embodiments of the present disclosure. It is apparent that the described embodiments are only some and not all of the embodiments of the present disclosure. Based on the embodiments of the present disclosure, all other embodiments obtained by a person skilled in the art without creative efforts are within the scope of the present disclosure.

In the description of the present disclosure, it should be understood that orientations or position relationships indicated by the terms including "upper" and "lower" are based on orientations or position relationships illustrated in the drawings. The terms are used to facilitate and simplify the description of the present disclosure, rather than indicate or imply that the devices or elements referred to herein are required to have specific orientations or be constructed or operate in the specific orientations. Accordingly, the terms should not be construed as limiting the present disclosure. In addition, the term "first", "second" are for illustrative purposes only and are not to be construed as indicating or imposing a relative importance or implicitly indicating the number of technical features indicated. Thus, a feature that limited by "first", "second" may expressly or implicitly comprise at least one of the features. In the description of the present disclosure, the meaning of "plural" is two or more, unless otherwise specifically defined.

Reference numerals and/or reference letters may be repeated in different implementations of the present disclosure. This repetition is for purposes of simplicity and clarity and does not indicate a relationship of the various embodiments and/or the settings.

A light-emitting plate and a method for manufacturing the light-emitting plate according to the present disclosure will be described in detail below with reference to specific embodiments and accompanying drawings.

Referring to FIG. 1, the present disclosure provides a light-emitting plate 100, wherein the light-emitting plate 100 comprises a drive substrate 10, a plurality of light sources 20 disposed on the drive substrate 10 and electrically connected to a circuit in the drive substrate 10, and a plurality of light reflecting structures 30 disposed on the drive substrate 10. One of the light sources 20 is located between two adjacent light reflecting structures 30.

In a specific application, the light sources 20 are Mini LED or Micro LED, and may be directly used as a display light source. In this case, the light-emitting plate 100 is a direct display panel.

In another specific application, the light sources 20 may be a backlight. In this case, the light-emitting plate 100 is essentially a part of a backlight module. The application of the light-emitting plate 100 is not limited in the present disclosure.

In an alternative embodiment of the present disclosure, the light-emitting plate 100 further comprises an encapsulation layer 40 formed on the drive substrate 10 and covering the light sources 20 and the light reflecting structures 30.

The drive substrate 10 comprises a substrate (not shown) and a drive circuit layer (not shown) formed on the substrate. The drive circuit layer is electrically connected to the light sources 20 for driving the light sources 20 to emit light.

The drive circuit layer comprises at least one of drive transistors (not shown), and each of the drive transistors comprises a gate, an active layer, and source and drain layers. The active layer is disposed opposite to the gate, the source and drain layers are disposed opposite to and electrically connected to the active layer, and the source and drain layers are electrically connected to the light sources 20. Each of the drive transistors further comprises a gate insulating layer covering the active layer, a passivation layer covering the source and drain layers, and a flat layer formed on the passivation layer. The light sources 20 and the light reflecting structures 30 are formed on the flat layer. Certainly, the structure of the drive circuit layer is not limited to the above description, and the drive circuit layer may be of other structures. Specifically, the drive transistors may be bottom gate structures, top gate structures, double gate structures, or the like. The drive transistors may be determined according to actual conditions.

In the present disclosure, the light sources 20 are light-emitting diodes (LEDs). It is understood that the light sources 20 are not limited to the light-emitting diodes, but may be other light sources.

In the present disclosure, the light sources 20 are at least one of red LEDs, green LEDs, blue LEDs, and the like. Two adjacent light sources 20 may have the same or different colors.

In this embodiment, two adjacent light sources 20 have different colors, and three adjacent light sources 20 (a red LED, a green LED, and a blue LED) constitute one light-emitting unit.

Each of the light sources 20 comprises a first light-exiting surface 21 away from the drive substrate 10, and a second light-exiting surface 22 and a third light-exiting surface 23 that are connected to the first light-exiting surface 21. The second light-exiting surface 22 and the third light-exiting surface 23 face their adjacent light reflecting structures 30, respectively.

In an alternative embodiment of the present disclosure, the second light-exiting surface 22 is not connected to the third light-exiting surface 23, and the second light-exiting surface 22 is disposed opposite to the third light-exiting surface 23. In this case, the light sources 20 may be of a polyhedral structure. The surfaces opposite to the light reflecting structure 30 are not limited to the second light-exiting surface 22 and the third light-exiting surface 23.

In another alternative embodiment of the present disclosure, the second light-exiting surface 22 is connected to the third light-exiting surface 23. In this case, the light sources 20 may be of a circular or partially circular structure, or an elliptical structure. The second light-exiting surface 22 and the third light-exiting surface 23 may be regarded as the same surface.

Each of the light reflecting structures 30 comprises a first surface 31 facing to the drive substrate 10, a second surface 32 away from the first surface 31, a first side surface 33 facing a adjacent light source 20, and a second side surface 34 away from the first side surface 33. The first side surface 33 and the second side surface 34 are connected at one end to the first surface 31 and at the other end to the second surface 32, respectively. The shortest distance between the first side surface 33 and the second side surface 34 is defined as d1, the distance between two ends of the first and second side surfaces 33 and 34 that are away from the drive substrate 10 is defined as d2, and the distance between two ends of the first and second side surfaces 33 and 34 that are in contact with the drive substrate 10 is defined as d3, and d1<d2 and d1<d3.

In this embodiment, the first side surface 33 faces the third light-exiting surface 23, and the second side surface 34 faces the second light-exiting surface 22.

In an alternative embodiment of the present disclosure, both of the first side surface 33 and the second side surface 34 are concave, and the first side surface 33 and the second side surface 34 are recessed toward each other.

In an alternative embodiment of the present disclosure, each of the first side surface 33 and the second side surface 34 is an arc surface, wherein the center of the arc surface is located on a side of an adjacent light source 20 facing the first side surface 33 or the second side surface 34.

In an alternative embodiment of the present disclosure, a height of the light sources 20 is lower than a height of the light reflecting structures 30 in a direction perpendicular to the drive substrate 10. That is, there is a height difference between the first light-exiting surface 21 and the second surface 32, so that the light from the second light-exiting surface 22 and/or the third light-exiting surface 23 of each of the light sources 20 can be emitted from the gap between the first light-exiting surface 21 and the second surface 32 after being reflected more than once, thereby further increasing light-emitting efficiency of the light sources 20.

In an alternative embodiment of the present disclosure, one of accommodating cavities 35 is disposed between two adjacent light reflecting structures 30, and the light sources 20 are accommodated in the accommodating cavities 35. When the height of the light sources 20 is lower than the height of the light reflecting structures 30 in the direction perpendicular to the drive substrate, a size d5 of an opening at an end (away from the drive substrate 10) of each of the accommodating cavities 35 is greater than or equal to a size d4 of the light sources 20 in a direction parallel to the drive substrate 10. In this way, the emitting of side light, reflected by the light reflecting structures 30, from the front surface of the light source 20 is not affected, thereby facilitating the increase of the light output efficiency of light sources 20.

In another alternative embodiment of the present disclosure, when the height of the light sources 20 is equal to the height of the light reflecting structures 30 in the direction perpendicular to the drive substrate, the size d5 of the opening at the end (away from the drive substrate 10) of each of the accommodating cavities 35 is greater than the size d4 of the light sources 20 in the direction parallel to the drive substrate 10. In this way, the emitting of side light, reflected by the light reflecting structures 30, from the front surface of the light source 20 is not affected, thereby facilitating the increase of the light output efficiency of light sources 20.

In an alternative embodiment of the present disclosure, a material for forming the light reflecting structures 30 comprises at least one of an ink base (not shown) and a photosensitive base (not shown), and reflective particles (not shown) dispersed in at least one of the ink base and the photosensitive base.

The ink base may be a component of a conventional ink mentioned in the prior art. The photosensitive base may be a component of a conventional photoresist mentioned in the prior art. Certainly, the ink base and the photosensitive base are not limited to the components of the conventional ink mentioned in the prior art and the components of the conventional photoresist mentioned in the prior art, but can also be formulated according to actual conditions.

Specifically, in an alternative embodiment of the present disclosure, the photosensitive base is formed by photocuring a photosensitive substance. The photosensitive substance makes the light reflecting structure have a photosensitive property, and the reflective particles make the light reflecting structure have a light reflecting property. Therefore, the light reflecting structure can be formed by a photolithography process.

Specifically, the photosensitive substance comprises a photosensitive resin, a reactive diluent, a photo-initiator, and other auxiliary agents. Specifically, in this embodiment, the photosensitive resin is a diazoquinone resin, the reactive diluent is propylene glycol-methyl ether (1-methoxy-2-propanol, PGME), and the auxiliary agents may include an anti-skinning agent, an anti-backprinting agent, a slipping agent, or the like. Certainly, the photosensitive resin is not limited to the diazoquinone resin, and the reactive diluent is not limited to the PGME, which can be selected according to actual situations.

Specifically, the ink base may comprise a resin substrate (binding material), a pigment, a filler, an auxiliary agent, a solvent, and the like. Since there are many ink formulations in the prior art, details are not described herein.

The reflective particles may be elementary substances or compounds of metals such as aluminum and silver with high reflectivity, or may be glass and pearlescent materials with high reflectivity.

In the present disclosure, the reflective particles have a diameter of less than 10 microns.

In the present disclosure, the shape of the reflective particles may be spherical, ellipsoidal, conical cylindrical, prismatic, cylindrical, irregular prismatic, or the like.

Figure 2:
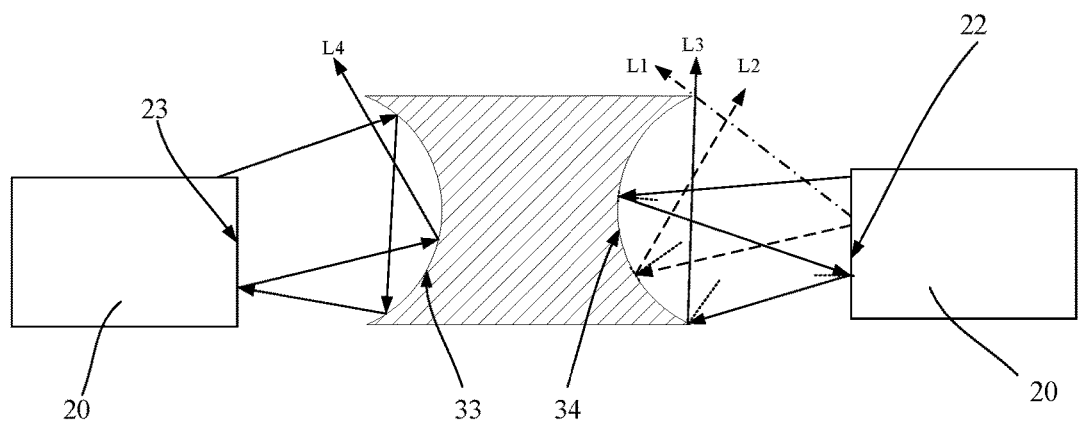
FIG. 2 is a schematic view of light rays of the light-emitting plate shown in FIG. 1.

Referring to FIG. 2, the partial light L1 emitted from the second light-exiting surface 22 or the third light-exiting surface 23 may be directly emitted from a position of the light reflecting structure 30 where the second surface 32 intersects with the first side surface 33 or the second side surface 34. The light L1 emitted from the position is boundary light of the light exiting from the light sources 20. The light exiting range of the light sources 20 depends on the height of the light reflecting structure 30. The partial light L2 emitted from the second light-exiting surface 22 or the third light-exiting surface 23 may be reflected once on the first side surface 33 or the second side surface 34 of the light reflecting structure 30 and emitted out. The partial light L3 emitted from the second light-exiting surface 22 or the third light-exiting surface 23 may be reflected more than once on the first side surface 33 or the second side surface 34 of the light reflecting structure 30 and the second light-exiting surface 22 or the third light-exiting surface 23 of the light source 20, and emitted out. The partial light L4 emitted from the first light-exiting surface 21 may be reflected more than once on the first side surface 33 or the second side surface 34 of the light reflecting structure 30 and the second light-exiting surface 22 or the third light-exiting surface 23 of the light source 20, and emitted out.

Figure 3:
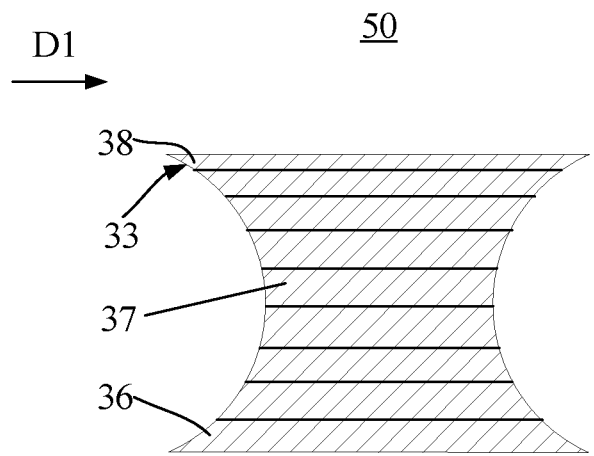
FIG. 3 is a cross-sectional view of a light reflecting structure of a light-emitting plate according to a second embodiment of the present disclosure.

Referring to FIGS. 1 and 3, a second embodiment of the present disclosure provides a light reflecting structure 50. The light reflecting structure 50 has a structure similar to that of the light reflecting structure 30, except that the light reflecting structure 50 comprises a plurality of light reflecting layers stacked on the drive substrate 10. The sizes of the light reflecting layers, from a light reflecting layer adjacent to the drive substrate 10 to a light reflecting layer farthest from the drive substrate 10, become smaller and then are increased in a first direction D1. The first direction D1 is parallel to the drive substrate 10 and is consistent with a recessed direction of the first side surface 33 of the light reflecting structure 30.

Accordingly, the light reflecting structure 50 may be formed by a 3D printing process. A material for forming the light reflecting structure 50 may comprise at least one of an ink base and a photosensitive base, and reflective particles dispersed in at least one of the ink base and the photosensitive base. That is, when the light reflecting structure 50 is formed by a 3D printing process, it is not limited whether the material for forming the light reflecting structure 50 comprises a photosensitive base.

Figure 4:
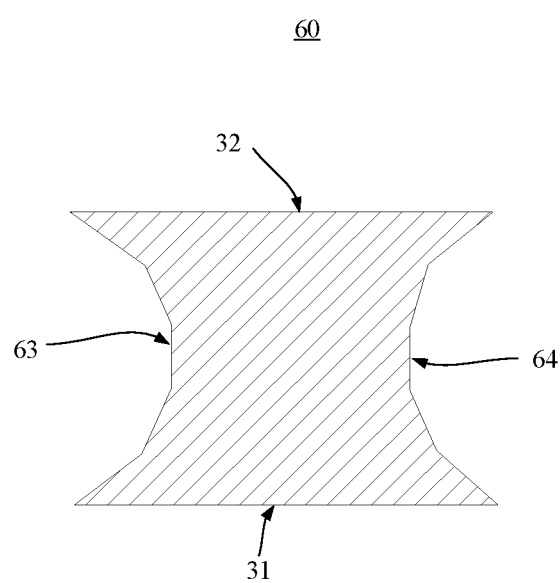
FIG. 4 is a cross-sectional view of a light reflecting structure of a light-emitting plate according to a third embodiment of the present disclosure.

Referring to FIG. 4, a third embodiment of the present disclosure provides a light reflecting structure 60. The light reflecting structure 60 is similar to the light reflecting structure 30, except that each of a first side surface 63 and a second side surface 64 of the light reflecting structure 60 is formed by connecting a plurality of planes. That is, the first side surface 63 and the second side surface 64 of the light reflecting structure 60 are not smooth arc surfaces.

Figure 5:
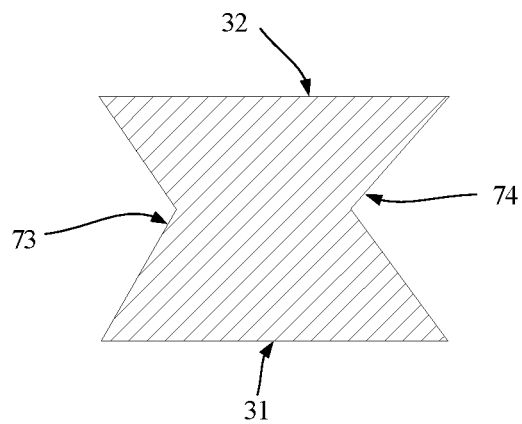
FIG. 5 is a cross-sectional view of a light reflecting structure of a light-emitting plate according to a fourth embodiment of the present disclosure.

Referring to FIG. 5, a fourth embodiment of the present disclosure provides a light reflecting structure 70. The light reflecting structure 70 is similar to the light reflecting structure 30, except that each of a first side surface 73 and a second side surface 74 of the light reflecting structure 70 is formed by connecting two planes.

Figure 6:
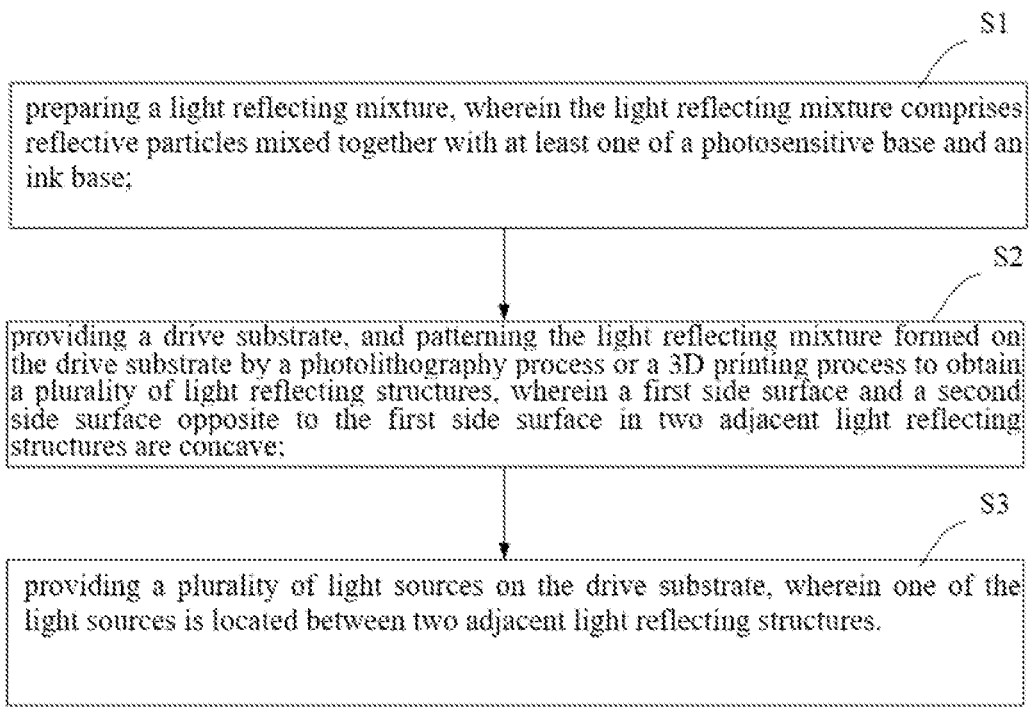
FIG. 6 is a flowchart of a method for manufacturing a light-emitting plate according to a preferred embodiment of the present disclosure.

Referring to FIGS. 1, 3 and 6, the present disclosure further provides a method for manufacturing a light-emitting plate, comprising the following steps:

S1. preparing a light reflecting mixture comprising reflective particles mixed together with at least one of a photosensitive substance and an ink base;

S2. providing a drive substrate 10, and patterning the light reflecting mixture formed on the drive substrate 10 by a photolithography process or a 3D printing process, to obtain a plurality of light reflecting structures; two opposite sides of two adjacent light reflecting structures are concave; and S3. providing a plurality of light sources 20 on the drive substrate 10, wherein one of the light sources 20 is located between two adjacent light reflecting structures 30 or 50.

In an alternative embodiment of the present disclosure, the materials for forming the light reflecting structures 30 comprise at least one of an ink base (not shown) and a photosensitive base (not shown), and reflective particles (not shown) dispersed in at least one of the ink base and the photosensitive base. The photosensitive base is formed by photocuring a photosensitive substance.

The light reflecting mixture may be obtained by directly mixing reflective particles together with at least one of the ink base (not shown) and the photosensitive substance, or may be obtained by adding the photosensitive substance into a light reflecting ink (comprising reflective particles and an ink base).

The ink base may be a component of a conventional ink mentioned in the prior art. The photosensitive substance may be a component of a conventional photoresist mentioned in the prior art. Certainly, the ink base and the photosensitive base are not limited to the component of the conventional ink mentioned in the prior art and the component of the conventional photoresist mentioned in the prior art, but can also be formulated according to actual conditions.

Specifically, in an alternative embodiment of the present disclosure, the photosensitive substance makes the light reflecting structure have a photosensitive property, and the reflective particles make the light reflecting structure have a light reflecting property. Therefore, the light reflecting structure can be formed by a photolithography process.

Specifically, the photosensitive substance comprises a photosensitive resin, a reactive diluent, a photoinitiator, and other auxiliary agents. Specifically, in this embodiment, the photosensitive resin is a diazoquinone resin, the reactive diluent is propylene glycol-methyl ether (1-methoxy-2-propanol, PGME), and the auxiliary agents may include an anti-skinning agent, an anti-backprinting agent, a slipping agent, or the like. Certainly, the photosensitive resin is not limited to the diazoquinone resin, and the reactive diluent is not limited to the PGME, which can be selected according to actual situations.

Specifically, the ink base may comprise a resin substrate (binding material), a pigment, a filler, an auxiliary agent, a solvent, and the like. Since there are many ink formulations in the prior art, details are not described herein.

The reflective particles may be elementary substances or compounds of metals such as aluminum and silver with high reflectivity, or may be glass or pearlescent materials with high reflectivity.

In the present disclosure, the reflective particles have a diameter of less than 10 microns.

In the present disclosure, the shape of the reflective particles may be spherical, ellipsoidal, conical cylindrical, prismatic, cylindrical, irregular prismatic, or the like.

In an alternative embodiment of the present disclosure, when the light reflecting mixture comprises the reflective particles and the photosensitive substance, or when the light reflecting mixture comprises the reflective particles, the photosensitive substance and the ink base, the light reflecting structure may be formed by a photolithography process or a 3D printing process. When the light reflecting mixture comprises the reflective particles and the ink base, the light reflecting structure may be formed by a 3D printing process.

In an alternative embodiment of the present disclosure, the photolithography process comprises coating the light reflecting mixture on the drive substrate 10; subjecting simultaneously one side of the light reflecting mixture facing to the drive substrate 10 and the other side of the light reflecting mixture away from the drive substrate 10 to a first heating; and patterning the light reflecting mixture by an exposure and development process; subjecting the patterned light reflecting mixture to a second heating, to obtain the light reflecting structures 30.

In an alternative embodiment of the present disclosure, the first heating may be performed by infrared heating. For example, the first heating of a side of the light reflecting mixture close to the drive substrate 10 and a side of the light reflecting mixture away from the drive substrate 10 may be performed simultaneously by irradiating a side of the drive substrate 10 away from the light reflecting mixture and the side of the light reflecting mixture away from the drive substrate 10 with an infrared light source according to the penetrating property of infrared heating. In order to facilitate the infrared ray to penetrate the drive substrate 10 and thereby heat the side of the light reflecting mixture close to the drive substrate 10, the drive substrate 10 should preferably be a transparent substrate or a light-transmitting substrate.

Specifically, when the light reflecting structures 30 are formed by a photolithography process, it is necessary for the light reflecting mixture to include a photosensitive substance.

The step of subjecting simultaneously one side of the light reflecting mixture facing to the drive substrate 10 and the other side of the light reflecting mixture away from the drive substrate 10 to a first heating may precure the light reflecting mixture, in which the content of solvents is reduced and some molecules undergo a pre-cross-linking reaction. The pre-cross-linking reaction improves the etching resistance of one side of the light reflecting mixture facing to the drive substrate 10 and the other side of the light reflecting mixture away from the drive substrate 10. The middle portion of the mixture has fewer molecules to undergo pre-crosslinking reaction, so the etching resistance thereof is lower than that of the two ends of the light reflecting mixture. Therefore, in the subsequent exposure and development process, the etched degree of the side of the light reflecting mixture facing to the drive substrate 10 and the other side of the light reflecting mixture away from the drive substrate 10 is lower than that of the middle of the light reflecting mixture, thereby facilitating to form concave surfaces (the first side surface 33 and the second side surface 34).

The second heating of the patterned light reflecting mixture can completely cure the light reflecting structures 30. Specifically, the temperature of the second heating is higher than the temperature of the first heating.

In an alternative embodiment of the present disclosure, the 3D printing process comprises performing a 3D printing to the light reflecting mixture as a 3D printing material on the drive substrate 10 in stages, so as to form a plurality of light reflecting layers stacked on the drive substrate 10. The sizes of the light reflecting layers become smaller and then increase from the light reflecting layer close to the drive substrate 10 to the light reflecting layer farthest from the drive substrate 10. The size of the light reflecting layer is a size of each of the light reflecting layers in the first direction D1. The first direction D1 is parallel to the drive substrate 10 and is in consistent with a recessed direction of the first side surface 33 of the light reflecting structure. Specifically, a bottom light reflecting layer 36 is formed on the drive substrate 10 by a 3D printing technique, an intermediate light reflecting layer 37 is formed on the bottom light reflecting layer 36, and a top light reflecting layer 38 is formed on the intermediate light reflecting layer 37. Each of the bottom light reflecting layer 36, the intermediate light reflecting layer 37, and the top light reflecting layer 38 comprises one or more of light reflecting films.

Specifically, when the light reflecting structures 30 is formed by a 3D printing process, the light reflecting mixture may or may not comprise a photosensitive substance. A rapid-curing agent (e.g., a light curing agent, etc.) may also be added to the light reflecting mixture to allow rapid shaping after printing; After curing, the photosensitive substance is transformed into a photosensitive base.

Figure 7:
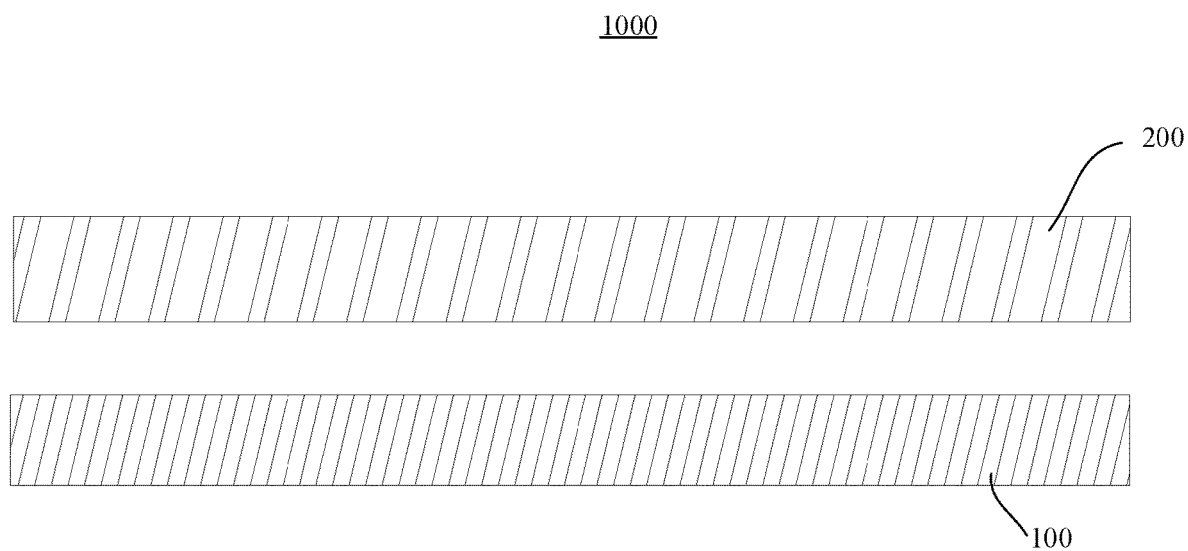
FIG. 7 is a cross-sectional view of a display terminal according to a preferred embodiment of the present disclosure.

Referring to FIG. 7, the present disclosure provides a display terminal 1,000 comprising a backlight module and a display panel 200. The backlight module is disposed opposite to the display panel 200. The backlight module comprises the light-emitting plate 100 as described above, and the light-emitting plate 100 is located on a light incident side of the display panel 200. The display panel 200 may be a liquid crystal display panel. The display panel 200 comprises an array substrate, liquid crystals, and a color film substrate. The array substrate is disposed opposite to the color film substrate, and the liquid crystals are sandwiched between the array substrate and the color film substrate. Since both of the liquid crystals and the color film substrate are of a structure known in the art, details are not described herein. Certainly, the display panel 200 is not limited to a liquid crystal display panel, and may be a quantum dot-emitting display panel or the like.

The present disclosure provides a light-emitting plate, a method for manufacturing the light-emitting plate, and a display terminal, in which one of light reflecting structures is disposed between two adjacent light sources, and surfaces of the light reflecting structures facing the light sources are set as concave surfaces. Therefore, light in each direction emitted from the side surfaces of two adjacent light sources can be collected by the light gathering effect of concave surfaces, so that not only optical crosstalk between the two adjacent light sources can be reduced, but also light output efficiency can be improved and light loss can be reduced, thereby improving image quality. In addition, the light reflecting structures having concave surfaces may be obtained by adjusting the components of the light reflecting mixture for preparing the light reflecting structure (for example, adding a photosensitive substance to the light reflecting ink, so that the light reflecting mixture has light reflecting and photolithographic properties; or directly adding reflective particles to the photoresist; or directly using the light reflecting ink), and then performing a photolithography process according to photosensitive characteristics of the light reflecting mixture. Alternatively, the light reflecting structures having concave surfaces may be obtained by directly forming a plurality of light reflecting layers stacked on the drive substrate using 3D printing process more than once, and then designing sizes of the stacked light reflecting layers (from the light reflecting layer close to the drive substrate to the light reflecting layer farthest from the drive substrate, the sizes of the light reflecting layers become smaller and then increase). Therefore, the method has a simple manufacturing process.

The display device and the manufacturing method of the display device provided by the embodiments of the present disclosure have been described in detail above. Specific examples are applied herein to illustrate the principles and implementations of the present disclosure, and the above descriptions of the embodiments are only used to help understand the technical solutions of the present disclosure and its core ideas. A person of ordinary skill in the art should understand that, it is still possible to modify the technical solutions recorded in the preceding embodiments, or to substitute some of the technical features with equivalent ones. These modifications or substitutions do not make the essence of the corresponding technical solutions depart from the scope of the technical solutions of the various embodiments of the present disclosure.

What is claimed is:

1. A light-emitting plate, comprising a drive substrate, and a plurality of light sources disposed on the drive substrate and electrically connected to a circuit in the drive substrate, wherein the light-emitting plate further comprises:
   a plurality of light reflecting structures disposed on the drive substrate,
   wherein one of the light sources is located between two adjacent light reflecting structures; each of the light reflecting structures comprises a first side surface facing an adjacent light source and a second side surface away from the first side surface; one end of the first side surface and one end of the second side surface are connected to the drive substrate;
   in one of the light reflecting structures, both of the first side surface and the second side surface are concave, and the first side surface and the second side surface are recessed toward each other, and
   a height of the light sources is equal to a height of the light reflecting structures in a direction perpendicular to the drive substrate.

2. The light-emitting plate according to claim 1, wherein both of the first side surface and the second side surface are arc surfaces, and a center of each of the arc surfaces is located on a side of the one of light sources facing the first side surface.

3. The light-emitting plate according to claim 1, wherein each of the first side surface and the second side surface is formed by connecting at least two planes.

4. The light-emitting plate according to claim 1, wherein one of accommodating cavities is disposed between the two adjacent light reflecting structures, and the light sources are accommodated in the accommodating cavities; and a size of an opening of one end of each of the accommodating cavities that is away from the drive substrate is greater than or equal to a size of the light sources in a direction parallel to the drive substrate.

5. The light-emitting plate according to claim 4, wherein one of accommodating cavities is disposed between the two adjacent light reflecting structures, and the light sources are accommodated in the accommodating cavities; and a size of an opening of one end of each of the accommodating cavities that is away from the drive substrate is greater than a size of the light sources in a direction parallel to the drive substrate.

6. The light-emitting plate according to claim 1, wherein a material for forming the light reflecting structures comprises at least one of an ink base and a photosensitive base, and reflective particles dispersed in at least one of the ink base and the photosensitive base.

7. The light-emitting plate according to claim 6, wherein each of the light reflecting structures comprises a plurality of light reflecting layers stacked on the drive substrate, and sizes of the light reflecting layers become smaller and then are increased in a first direction from a light reflecting layer close to the drive substrate to a light reflecting layer farthest from the drive substrate; wherein the first direction is parallel to the drive substrate and is in consistent with a recessed direction of the first side surface of each of the light reflecting structures.

8. The light-emitting plate according to claim 6, wherein the reflective particles have a diameter of less than 10 microns.

9. A method for manufacturing a light-emitting plate, comprising the steps of:
   preparing a light reflecting mixture, wherein the light reflecting mixture comprises reflective particles mixed together with at least one of a photosensitive base and an ink base;
   providing a drive substrate, and patterning the light reflecting mixture formed on the drive substrate by a photolithography process or a 3D printing process to obtain a plurality of light reflecting structures, wherein a first side surface and a second side surface opposite to the first side surface in two adjacent light reflecting structures are concave; and
   providing a plurality of light sources on the drive substrate, wherein one of the light sources is located between two adjacent light reflecting structures,
   wherein a height of the light sources is equal to a height of the light reflecting structures in a direction perpendicular to the drive substrate.

10. The method according to claim 9, wherein in case that the light reflecting mixture comprises the reflective particles and the photosensitive base, or comprises the reflective particles, the photosensitive base and the ink base, the photolithography process or the 3D printing process is carried out to form the light reflecting structures; and
   in case that the light reflecting mixture comprises the reflective particles and the ink base, the 3D printing process is carried out to form the light reflecting structures.

11. The method according to claim 10, wherein the photolithographic process comprises the steps of:
   coating the light reflecting mixture on the drive substrate;
   subjecting simultaneously one side of the light reflecting mixture facing to the drive substrate and the other side of the light reflecting mixture away from the drive substrate to a first heating;
   patterning the light reflecting mixture by an exposure and development process; and
   subjecting the patterned light reflecting mixture to a second heating to obtain the light reflecting structures.

12. The method according to claim 10, wherein the 3D printing process comprises performing a 3D printing to the light reflecting mixture as a 3D printing material on the drive substrate in stages, to form a plurality of light reflecting layers stacked on the drive substrate; and sizes of the light reflecting layers become smaller and then are increased in a first direction, from a light reflecting layer close to the drive substrate to a light reflecting layer farthest from the drive substrate; wherein the first direction is parallel to the drive substrate and is in consistent with a recessed direction of the first side surface of each of the light reflecting structures.

13. A display terminal, comprising a backlight module and a display panel disposed opposite to each other, wherein the backlight module comprises a light-emitting plate located on a light incident side of the display panel, and the light-emitting plate comprises a drive substrate and a plurality of light sources disposed on the drive substrate and electrically connected to a circuit of in the drive substrate; and the light-emitting plate further comprises:
   a plurality of light reflecting structures disposed on the drive substrate;
   one of the light sources is located between two adjacent light reflecting structures, and each of the light reflecting structures comprises a first side surface facing an adjacent light source and a second side surface away from the first side surface;
   in one of the light reflecting structures, both of the first side surface and the second side surface are concave, and the first side surface and the second side surface are recessed toward each other, and
   a height of the light sources is equal to a height of the light reflecting structures in a direction perpendicular to the drive substrate.

14. The display terminal according to claim 13, wherein both of the first side surface and the second side surface are arc surfaces, and a center of each of the arc surfaces is located on a side of the one of light sources facing the first side surface.

15. The display terminal according to claim 13, wherein each of the first side surface and the second side surface is formed by connecting at least two planes.

16. The display terminal according to claim 13, wherein one of accommodating cavities is disposed between the two adjacent light reflecting structures, and the light sources are accommodated in the accommodating cavities; and a size of an opening of one end of each of the accommodating cavities that is away from the drive substrate is greater than a size of the light sources in a direction parallel to the drive substrate.

17. The display terminal according to claim 13, wherein a material for forming the light reflecting structures comprises at least one of an ink base and a photosensitive base, and reflective particles dispersed in at least one of the ink base and the photosensitive base.

* * * * *